United States Patent [19]

Manz

[11] 3,718,802
[45] Feb. 27, 1973

[54] RIPPLE CONTROL FOR ELECTRIC ARC WELDING POWER SUPPLY APPARATUS

[75] Inventor: August Frederick Manz, Union, N.J.

[73] Assignee: Union Carbide Corporation, New York, N.Y.

[22] Filed: June 30, 1971

[21] Appl. No.: 158,395

[52] U.S. Cl. ................ 219/131 WR, 219/135, 320/1
[51] Int. Cl. ............................................. B23k 9/10
[58] Field of Search .......... 320/1; 323/23, 25, 43.5 S; 307/108, 109, 252 N, 305; 219/131, 135

[56] References Cited

UNITED STATES PATENTS 3,328,673    6/1967    Nuckous ..................... 323/225 C X
3,356,928   12/1967    Parrish ......................... 219/131 R X
3,524,041    8/1970    Manz ................................. 219/137

*Primary Examiner*—R. F. Staubly
*Assistant Examiner*—George A. Montanye
*Attorney*—Paul A. Rose et al.

[57]    ABSTRACT

Power supply apparatus for producing a continuous ripple direct current comprising a single phase A.C. source of power, a series connected parallel network consisting of a variable inductor in parallel with a series connected resistor and capacitor, a silicon controlled rectifier interposed between the power source and the parallel network and charging means for charging the capacitor during the positive half-cycle of alternating input current.

4 Claims, 4 Drawing Figures

PATENTED FEB 27 1973 3,718,802

INVENTOR
AUGUST F. MANZ
BY
ATTORNEY

RIPPLE CONTROL FOR ELECTRIC ARC WELDING POWER SUPPLY APPARATUS

This invention relates to electric arc working power supply apparatus for direct current consumable electrode arc welding.

One way to achieve control over the amount of heat energy delivered to the weld puddle for any consumable electrode arc welding process is to selectively adjust the output wave characteristic of the power supply. By altering the output wave shape of the power supply the mode of electrode metal transfer may be varied. In U.S. Pat. No. 3,524,041 issued Aug. 11, 1970 in the name of A. F. Manz a method is described for providing adjustable control over the various modes of electrode metal transfer which involves generating single-phase alternating current, rectifying and filtering the alternating current to provide continuous ripple direct current at the fundamental frequency of the alternating current, supplying the continuous ripple direct current to the arc to sustain the arc and then directing the arc against a workpiece to perform the welding operation. A continuous ripple is defined as a periodically occurring wave shape with each wave being contiguous to one another and specifically excluding wave shapes which are discreetly spaced from one another.

The present invention is directed specifically to power supply apparatus for generating a continuous ripple direct current output which permits the above indicated method to be practiced over an extended average D.C. output current range.

The power supply apparatus in accordance with the present invention comprises: a single-phase alternating current source of power having an output lead and a return lead, said return lead being adapted to be connected to said workpiece; a silicon controlled rectifier having an anode, cathode, and a control gate, said anode being connected in series with the output lead of said alternating current source of power; a variable inductor having one end connected to said cathode and the opposite end adapted for connection to said electrode; a series coupled resistor and capacitor circuit, one end of said circuit being coupled to said cathode and the other end being connected to said return lead; trigger means for energizing the control gate of said silicon controlled rectifier at a predetermined instant of time during the positive half-cycle of said alternating source of power, and means electrically coupled to said alternating current source of power and to said capacitor for supplying said capacitor with a predetermined amount of charging energy.

Figure 1:
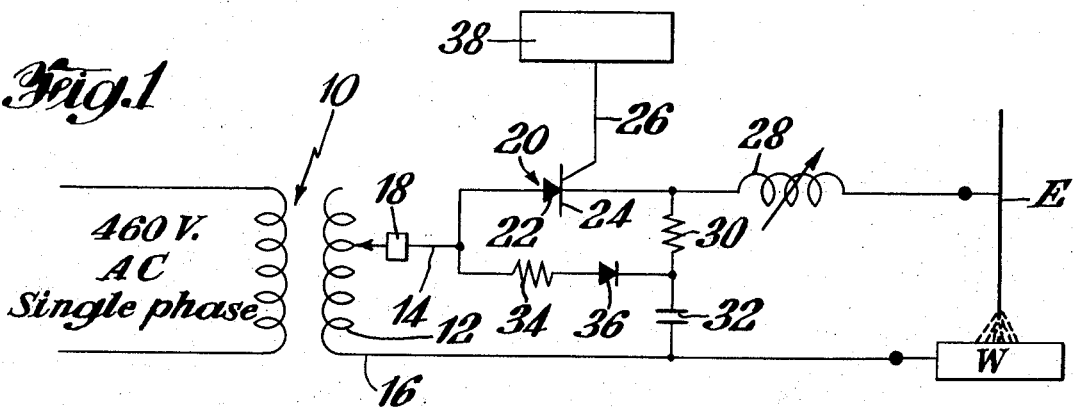
FIG. 1 is a circuit diagram of the preferred power supply apparatus of the present invention shown connected to an electrode and workpiece for performing a welding operation.

Referring now to FIG. 1, which is a schematic teaching of the preferred power supply circuit of the invention, a transformer 10 is shown connected on its primary side to a conventional single-phase alternating current source of power which has a typical operating frequency of 60 Hz (CPS) at 460 volts AC. The secondary winding 12 of transformer 10 has an output lead 14 preferably representing the positive side of the power supply and a common return lead 16 which may represent the negative or ground terminal of the power supply. The output lead 14 is connected to the secondary winding 12 by means of a slideable brush assembly 18 to permit the open circuit voltage to be adjusted.

A silicon controlled rectifier 20 having an anode 22, cathode 24 and control gate 26 is connected with its anode 22 in series with the output lead 14 and its cathode 24 connected to a parallel network consisting of a variable inductor 28 in parallel with a series connected resistor 30 and capacitor 32. The other end of the series connected resistor 30 and capacitor 32 combination is connected to the return lead 16. A separate charging circuit is provided for the capacitor 32 which consists of a series connected resistor 34 and diode 36. The charging circuit is connected at one end to the output lead 14 and at the other end to capacitor 32. The control gate 26 of silicon controlled rectifier 20 is connected to a conventional triggering circuit 38 shown, for simplicity, in block form.

To perform a welding operation the variable inductor 28 is connected to the electrode E while the return lead 16 is connected to the workpiece W. An arc is initiated in any conventional manner between the electrode E and workpiece W. A continuous ripple direct current is supplied to the arc with the average D.C. current being determined by the duration and shape of the ripple waveform for a given output voltage. As taught in the aforementioned patent by increasing the inductance the average D.C. current level is increased and the ripples become rounder in shape eventually approximating a continuous sinusoidal waveform while a decrease in inductance decreases the average current level and eventually the current wave shape approximates a half-wave sinusoid with rounded trailing edges connecting ripples in a continuous manner.

Figure 2:
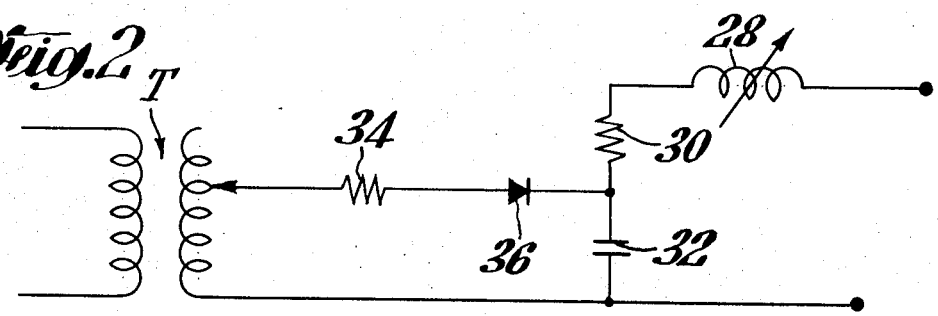
FIG. 2 is the equivalent circuit of the power supply apparatus of FIG. 1 with the SCR in its nonconducting state.
Figure 3:
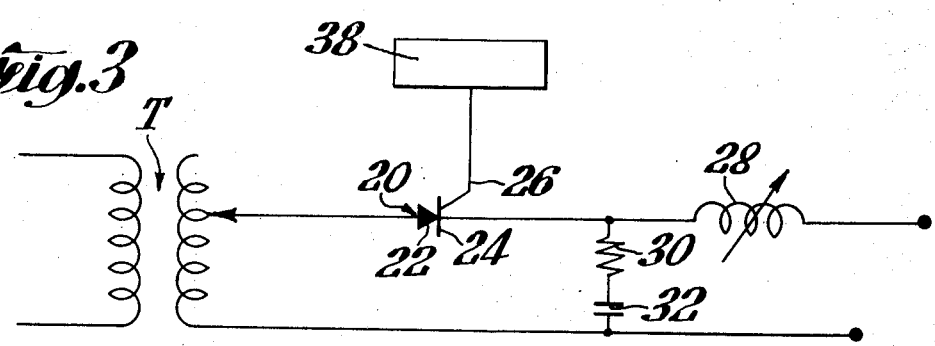
FIG. 3 is the circuit equivalent of the power supply apparatus of FIG. 1 with the SCR in its conducting state.

The circuit shown in FIG. 1 increases the range of average D.C. current over what can be realized using only a diode half-wave rectifier element and without a separate capacitor charging circuit. The SCR 20 provides greater control over the ripple waveform since it can be energized at any predetermined instant of time during the positive half-cycle of alternating input current. This enables the ripple duration in the current waveform to be selectively controlled thereby permitting lower current operation. To realize the benefits of using an SCR, however, without affecting arc stability it is essential and critical that the capacitor 32 receive charging energy during that part of the positive half-cycle of alternating input current when the SCR 20 is nonconducting. This energy is provided by the charging circuit defined by the resistor 34 and diode 36 combination. FIG. 2 is the equivalent circuit of FIG. 1 with the SCR 20 in the nonconducting state. Once the SCR 20 is triggered the circuit of FIG. 1 reduces to that shown in FIG. 3. Throughout most of the positive half-cycle of alternating input current energy flows into capacitor 32. When the SCR 20 is off the capacitor 32 is charged through resistor 34 and diode 36. As soon as SCR 20 is energized capacitor 32 still continues to receive charging energy until the instantaneous voltage built-up thereacross is greater than the instantaneous impressed supply voltage.

Figure 4:
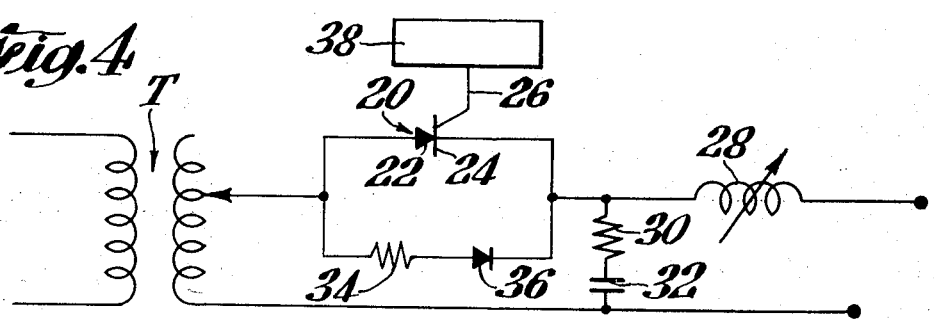
FIG. 4 is a circuit diagram of an alternative power supply apparatus in accordance with the present invention.

An alternative connection for the charging circuit is shown in FIG. 4 with the resistor 34 diode 36 combination directly connected across SCR 20.

What is claimed is:

1. Power supply apparatus for providing a continuous ripple direct current output to an electrode spaced above a workpiece for performing a welding operation comprising: a single-phase alternating current source of power having an output lead and a return lead, said return lead being adapted to be connected to said workpiece; a silicon controlled rectifier having an anode, cathode, and a control gate, said anode being connected in series with the output lead of said alternating current source of power; a variable inductor having one end connected to said cathode and the opposite end adapted for connection to said electrode, a series coupled resistor and capacitor circuit, one end of said circuit being coupled to said cathode and the other end being connected to said return lead; trigger means for energizing the control gate of said silicon controlled rectifier at a predetermined instant of time during the positive half-cycle of said alternating current source of power, and means comprising a diode connected at one end in common to said anode and at its opposite end to said capacitor for supplying said capacitor with a predetermined amount of charging energy.

2. Power supply apparatus as defined in claim 1 wherein said means for supplying charging energy to said capacitor comprises a diode having an anode connected to said alternating current source of power and a cathode coupled to said capacitor.

3. Power supply apparatus as defined in claim 2 wherein a resistor is connected in series with said diode.

4. Power supply apparatus as defined in claim 3 wherein the cathode end of said diode is directly connected to the cathode of said silicon controlled rectifier.

* * * * *